May 22, 1945.  B. F. TELLKAMP  2,376,635
EXPANSIBLE MEMBER MOUNTING
Filed June 23, 1943  3 Sheets-Sheet 1
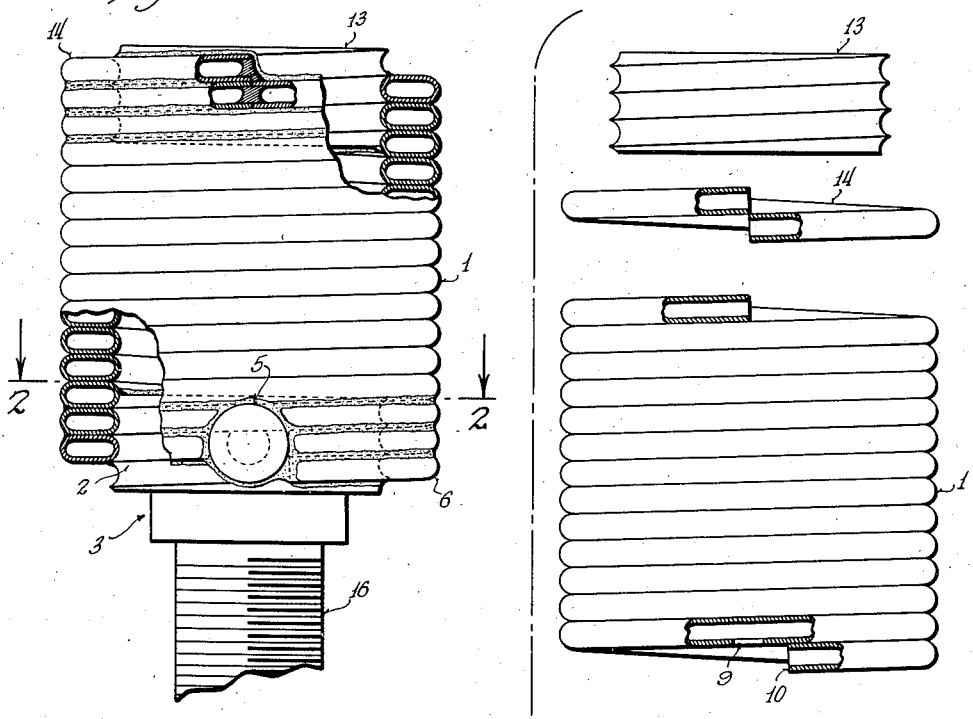
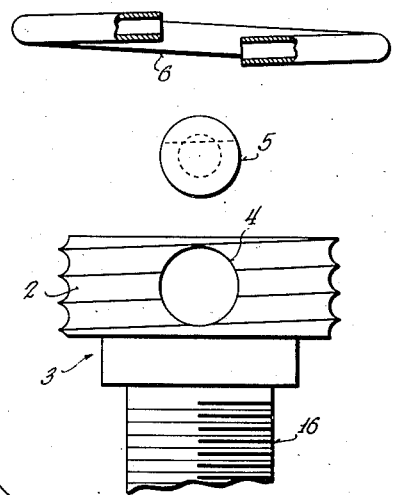
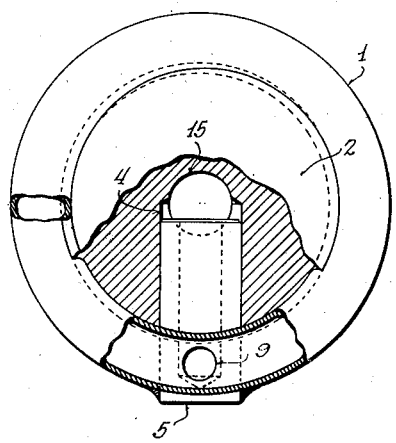
INVENTOR.
Bernhard F. Tellkamp
BY David A. Fox
ATTORNEY.

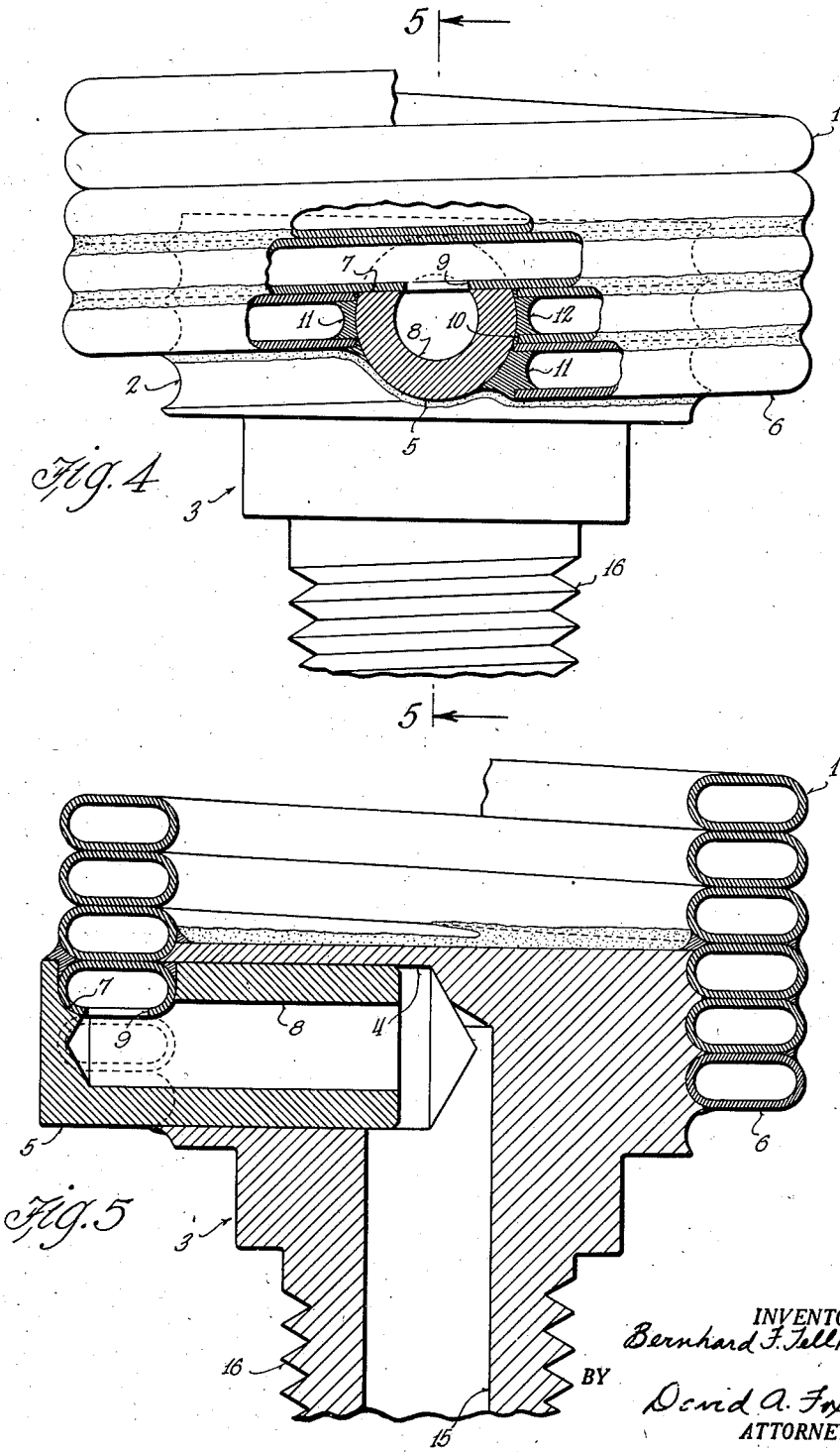

May 22, 1945.   B. F. TELLKAMP   2,376,635
EXPANSIBLE MEMBER MOUNTING
Filed June 23, 1943   3 Sheets-Sheet 3

INVENTOR.
Bernhard F. Tellkamp
BY
David A. Fox
ATTORNEY

Patented May 22, 1945

2,376,635

UNITED STATES PATENT OFFICE 2,376,635

EXPANSIBLE MEMBER MOUNTING

Bernhard F. Tellkamp, Whitefish Bay, Wis., assignor to Allen-Bradley Company, Milwaukee, Wis., a corporation of Wisconsin Application June 23, 1943, Serial No. 492,178

6 Claims. (Cl. 137—156)

This invention relates to mounting arrangements for resilient expansible members of the specific type described in my co-pending application, Serial No. 477,676, filed March 1, 1943, and resides in a feature of improvement therefor comprising a combination of a threaded base, a notched spigot and a false turn seat which can be readily manufactured with the degree of accuracy required, so that the parts can be readily and quickly assembled in such a way that soldering to form a hermetical connection may be readily accomplished by reason of the relationship of capillary and non-capillary clearances.

For the formation of the connection between an edge-wound tubular expansible member and the hydraulic access seat therefor, a hermetical juncture is desirable and the use of hard soldered joints for this purpose has been found very effective. However, certain difficulties have been encountered in making such joints because the helical member, for satisfactory performance, must have a helical seat of corresponding pitch and the provision of this properly positioned with respect to the helical member, while at the same time providing a completely sealed and effective hydraulic access, has entailed close care and attention and soldering technique and skill of a very high order. Through this invention, however, this tedious and expensive operation is obviated and assembly of the parts and the soldering of the same is reduced to a simple routine which may be followed by a person of ordinary skill, with a high degree of assurance of successful results.

To secure these results means are provided through this invention for positioning an aperture in the helical member of maximum transverse dimension, opposite an aperture also of maximum transverse dimension in a notched floating spigot, in such a way that precise radial alignment is ensured by the notch in the spigot, and by its floating character precise angular alignment is attainable by bringing the end of an additional turn of the helical member against the side of the spigot. By this ready method of precise alignment the hydraulic access opening can be made with sufficient transverse dimensions so that capillary bridging by the molten solder is inhibited and at the same time all other openings are maintained below that maximum clearance which the molten solder will bridge by capillary action. With this condition maintained, simple introduction of the solder and maintenance of the proper temperature results in a proper hermetic seal and at the same time provides a helical seat without which the helical member cannot function properly.

In the drawings which form a part hereof there is set forth and shown by way of illustration and not of limitation one form in which the invention may be embodied. The several views are as follows:

Fig. 1 is a view in front elevation with parts broken away of one form of the apparatus of this invention in completed form;

Fig. 2 is a top plan view partly broken away and in section of the apparatus shown in Fig. 1;

Fig. 3 is an expanded view in front elevation and prior to assembly of the several parts which go together to form the apparatus shown in Fig. 1;

Fig. 4 is an enlarged detailed fragmentary view in front elevation of the lower part of the apparatus shown in Fig. 1 for the purpose of showing the clearances and the location of solder in the vicinity of the fluid access channel;

Fig. 5 is an enlarged detailed fragmentary view in side elevation and in section viewed through the plane 5—5 in Fig. 4;

Figure 6:
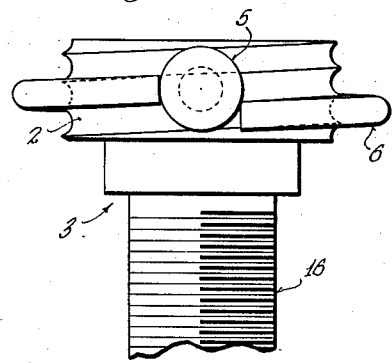

Figs. 6, 7, 8, and 9 are successive fragmentary views in front elevation showing several stages during the process of assembly of the apparatus shown in Fig. 1.

The specific form of the apparatus of this invention shown in the drawings resides in a specialized mounting for an edge-wound tubular expansible member 1 of the form described in detail and claimed in my co-pending application above referred to. As appears in Fig. 1 and more in detail in Figs. 4 and 5, the lower portion of the tubular member 1 engages the threaded side surfaces 2 of the circular mounting base designated generally by the numeral 3. The thread 2 is of a contour corresponding to the internal thread-like contour of the inside of the tubular member 1, so that these parts may be screwed together as with a threaded connection.

Emerging radially through the threaded side surface 2 of the base 3, is a radial passage 4, the axis of which intersects the root line of the middle turn of thread 2. Within the passage 4, a hollow spigot 5 is slidingly received. Prior to insertion of the spigot 5 a false turn 6 of tubing similar to that from which the tubular element 1 is constructed and having a gap approximately equal to the diameter of the spigot 5 is run on to the thread 2 of the base 3 to occupy the turn of threads immediately below the center of passage 2. Thereupon the spigot 5 is put into place as shown in Fig. 6, to complete the first state in the assembly of the apparatus.

As shown more clearly in Fig. 4, the spigot 5 has an external diameter approximating three times the pitch of the thread 2 so that the thread immediately above the spigot 5 would be interfered with, were it not for an arcuate upwardly facing notch 7, cut from the spigot 5 to a depth approximately equal to the pitch of the thread 2. The spigot 5 is hollow by reason of a central bore 8, the internal diameter of which is substantially in excess of the pitch of the thread 2, and by reason of this the bore 9 and the notch 7 intersect one another forming an opening in the outer end of the spigot 5, surrounded by a surface which conforms with the under side of the bottom turn of the tubular element 1.

Figure 8:
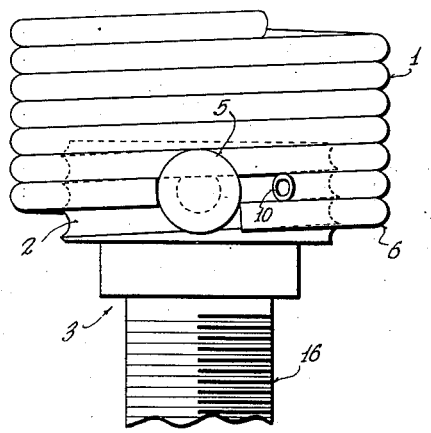
Figure 7:
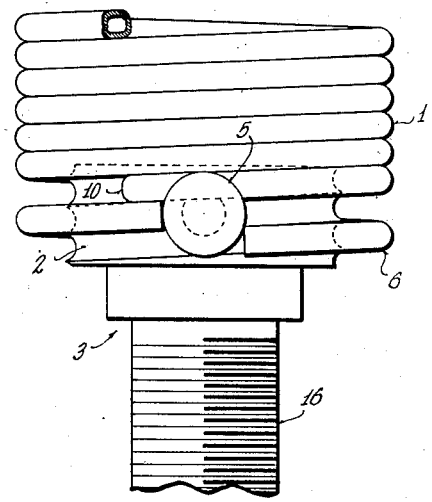
Figure 9:
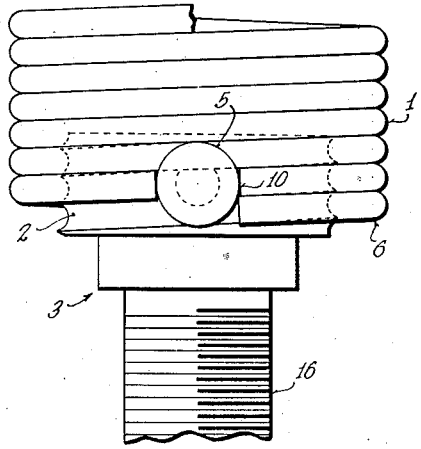

The next stage of the assembly operation as shown in Fig. 7, is the engaging of the element 1 with the thread 2, and the turning of these parts relatively to one another until the end of element 1 passes through the notch 7 in spigot 5. When this is accomplished the spigot 5 becomes positively located radially in preparation for final engagement of the parts which is approached as shown in Fig. 8, and achieved upon further turning as shown in Fig. 9.

As shown clearly in Fig. 3, and also in Figs. 2, 4, and 5, an aperture 9 is formed in the lower wall of the last turn of element 1 and close to the beginning of the second turn thereof. The aperture 9 is so located with respect to the end 10 of the element 1 that it is brought into registry with the opening in the spigot 5 formed by the notch 7, as appears clearly in Figs. 2 and 4.

In this way the parts, on assembly, are precisely positioned in preparation for soldering without dependence upon holding jigs or fixtures. This is particularly advantageous in securing alignment between the aperture 9 in tubular member 1 and the opening formed by the notch 7 in the spigot 5, which alignment cannot be secured by inspection because of its concealed character.

In units of small or moderate size, which are frequently required, the smaller diameter of the flattened tubing 1 is less than the dimension which a hard solder with proper flow and surface tension characteristics will bridge by capillary action. In the drawings solder has been shown by stippling and by closely spaced cross hatching in the position which it will assume in such a unit of small size. Referring particularly to Fig. 4, it will be noted that solder indicated at 11 and 11 has been drawn in by capillary action to close the ends of the false turn 6. In like manner solder 12 has been drawn by capillary action into the end 10 of tubular member 1. Furthermore, interstitial solder between all adjacent faces of the tubular member 1, the base 3, the spigot 5 and the false turn 6 acts to solidly unite these parts so as to form, in effect, a helical seat for the member 1, the same being essential to handle the high thrusts of which a unit of this type is capable.

In order to avoid the blocking of the essential fluid access through the aperture 9 in member 1, this aperture is made with a diameter as large as the flat surface of tube 1 will accommodate. By careful inspection of the drawings, particularly Figs. 4 and 5, it will be noted that the diameter of the aperture 9 is even greater than the smaller internal diameter of tubing 1 and also greater than the maximum distance spanned anywhere by the solder under the effects of capillarity. By reason of this relationship of dimensions, soldering may be accomplished simply by bringing the parts to appropriate soldering temperature while applying and melting the solder, which under the action of capillary attraction becomes drawn into all of the places required without danger of being drawn into the aperture 9. In Figs. 4 and 5 the spaces occupied by the solder are clearly shown, it being borne in mind that it is impossible to show in the drawings very thin layers of solder between contiguous faces.

If desired, during assembly thin strips or wires of solder may be laid into the spaces between adjacent parts in known manner, whereupon soldering may be accomplished simply by bringing the parts to a temperature above the melting point of the solder.

The upper end of the member 1 may be closed in similar manner by providing a threaded cap 13 and a top false turn 14, which may be united as shown in Fig. 1 by soldering in similar fashion.

The base 3 is provided with a downwardly projecting threaded portion 16 having an internal channel 15 in communication with the radial passage 4. In this way a fluid connection channel is provided by which attachment of the apparatus to a fluid system may be accomplished.

While the expansible member 1 is of a type peculiarly adapted to withstand very high pressures and therefore is normally required to exert very high thrusts, in certain applications, such high pressures and thrusts may not be involved, in which case the strengthening effect of the false turn 6 may not be required. In such cases the false turn 6 may be omitted.

The form of the apparatus shown and described herein has advantages in that the several parts may be readily manufactured employing equipment of conventional character. Variations in the specific design, however, may be convenient depending upon equipment available for production of the parts, which variations remain within the scope of the principle of the invention herein disclosed.

That which I claim as my invention is:

1. In a resilient expansible apparatus, a tubular expansible member in the form of a closely laid helical coil having a plurality of adjacent turns bearing against one another said tube being so arranged that it contains fluid in pressure transmitting relationship with the interior walls thereof, a mounting means comprising a circular base, the side surfaces of which are provided with an external thread having a configuration which approximates the internal thread-like contour of the inside of said coil, said base and said coil being assembled in threaded relationship to one another, said base having a connection passage emerging at one side in juxta-position with a surface of said tubular member, said tubular member being provided with an opening in registry with said connection passage, and solder in bonded engagement with adjacent surfaces of said tubular member and said base and arranged to occupy the interstices therebetween to hermetically join said connection passage with said tubular member and to unite a lower turn of said tubular member with said base to form a helical seat for said tubular member.

2. In a resilient expansible apparatus, an edge-wound tubular expansible member in the form of a closely laid helical coil of flattened tubing having a plurality of adjacent turns bearing against one another and having an opening near one end said tube being so arranged that it contains fluid in pressure transmitting relationship with the interior walls thereof, a mounting means comprising a circular base, the side surfaces of which are provided with an external thread having a configuration which approximates the internal thread-like contour of the inside of said coil, means forming a radial passage extending into said base, a connection bore in said base in communication with said radial passage, said base and said tubular member being assembled in threaded relationship to one another with the opening in said tubular member in registry with said radial passage means, and solder arranged to occupy the interstices between and being in bonded engagement with adjacent surfaces of said tubular member said base and said radial passage means to hermetically join the same to form with said connection bore a fluid access channel and to unite a lower turn of said tubular member with said base to form a helical seat for said tubular member.

3. In a resilient expansible member, an edge-wound tubular expansible member in the form of a closely laid helical coil of flattened tubing having a plurality of adjacent turns bearing against one another said tubing being so arranged that it contains fluid in pressure transmitting relationship to the interior walls thereof, a mounting means comprising a circular base, the side surfaces of which are provided with an external thread having a configuration which approximates the internal thread-like contour of the inside of said coil, said base and said tubular member being assembled in threaded relationship to one another, said base having a radial opening therein emerging through the threaded side surfaces thereof, said base also having a connection bore in communication with said radial opening, a hollow spigot adapted upon assembly for close fitting sliding engagement with said radial opening and assembled therein, the inner end of said spigot being open for communication with said connection bore, the outer end of said spigot having an opening formed by a notch having a shape coincident with the external surface of a portion of a lower turn of said tubular member as assembled on said base, said tubular member being provided with an opening in registry with the opening formed in the outer end of said spigot, and solder arranged to occupy the interstices between and being in bonded engagement with adjacent surfaces of said tubular member said base and said spigot to hermetically join the same to form with said connection bore a fluid access channel and to unite a lower turn of said tubular member with said base to form a helical seat for said tubular member.

4. In a resilient expansible apparatus, an edge-wound tubular expansible member in the form of a closely laid helical coil of flattened tubing having a plurality of adjacent turns bearing against one another said tubing being so arranged that it contains fluid in pressure transmitting relationship with the interior walls thereof, a mounting means comprising a circular base, the side surfaces of which are provided with an external thread having a configuration which approximates the internal thread-like contour of the inside of said coil, said base and said tubular member being assembled in threaded relationship to one another, said base having a radial opening therein emerging through the threaded side surfaces thereof, said base also having a connection bore in communication with said radial opening, a hollow spigot adapted upon assembly for close fitting sliding engagement with said radial opening and assembled therein, the inner end of said spigot being open for communication with said connection bore, the outer end of said spigot having an opening which passes through a surface adapted to engage the external surface of a portion of a lower turn of said tubular member as assembled on said base, said tubular member being provided with an opening in registry with the opening formed in the outer end of said spigot, and solder arranged to occupy the interstices between and being in bonded engagement with adjacent surfaces of said tubular member said base and said spigot to hermetically join the same to form with said connection bore a fluid access channel and to unite a lower turn of said tubular member with said base to form a helical seat for said tubular member.

5. In a resilient expansible apparatus, an edge-wound tubular expansible member in the form of a closely laid helical coil of flattened tubing having a plurality of adjacent turns bearing against one another said tubing being so arranged that it contains fluid in pressure transmitting relationship with the interior walls thereof, a mounting means comprising a circular base, the side surfaces of which are provided with an external thread having a configuration which approximates the internal thread-like contour of the inside of said coil, said base having a radial opening therein emerging through the threaded side surfaces thereof, the axis of which radial opening intersects the root line of a thread on said base at least one full thread from the top of said base, said base also having a connection bore in communication with said radial opening, a hollow spigot having an external diameter of approximately three times the pitch of the thread on said base and an internal diameter substantially greater than the pitch of said thread, said spigot being adapted upon assembly for close fitting sliding engagement with said radial opening and assembled therein, the inner end of said spigot being open for communication with said connection bore, the outer end of said spigot having an opening formed by an upwardly facing notch having a shape coincident with the lower external surface of a portion of said tubular member when assembled on said base, said base and tubular member being assembled in threaded relationship with one another with the end of said tubular member in abutting relationship with one side of said spigot and the beginning portions of the under side of the second turn of said tubular member in engagement with said notch, said tubular member being provided with an opening in registry with the opening formed in the outer end of said spigot, and solder arranged to occupy the interstices between and being in bonded engagement with adjacent surfaces of said tubular member said base and said spigot to hermetically join the same to form with said connection bore a fluid access channel and to unite a lower turn of said tubular member with said base to form a helical seat for said tubular member.

6. In a resilient expansible apparatus, an edge-wound tubular expansible member in the form of a closely laid helical coil of flattened tubing having a plurality of adjacent turns bearing against one another said tubing being so arranged that it contains fluid in pressure transmitting relationship with the interior walls thereof, a mounting means comprising a circular base, the side surfaces of which are provided with an external thread having a configuration which approximates the internal thread-like contour of the inside of said coil, said base having a radial opening therein emerging through the threaded side surfaces thereof, the axis of which radial opening intersects the root line of a thread on said base at least one full thread from the top of said base, said base also having a connection bore in communication with said radial opening, a hollow spigot having an external diameter of approximately three times the pitch of the thread on said base and an internal diameter substantially greater than the pitch of said thread, said spigot being adapted upon assembly for close fitting sliding engagement with said radial opening and assembled therein, the inner end of said spigot being open for communication with said connection bore, the outer end of said spigot having an opening formed by an upwardly facing notch having a shape coincident with the lower external surface of a portion of said tubular member as assembled on said base, said base and tubular member being assembled in threaded relationship with one another with the end of said tubular member in abutting relationship with one side of said spigot and with the beginning portions of the under side of the second turn of said tubular member in engagement with said notch, said tubular member being provided with an opening in registry with the opening formed in the outer end of said spigot, a false turn of edge-wound tubing also in threaded engagement with said base forming a supplementary seat immediately beneath said tubular member, said false turn having two free ends in abutting relationship with said spigot, and solder arranged to occupy the interstices between and being in bonded engagement with adjacent surfaces of said tubular member said base said spigot and said false turn to hermetically join the same to form with said connection bore a fluid access channel and to unite a lower turn of said tubular member and said false turn with said base to form a helical seat for said tubular member.

BERNHARD F. TELLKAMP.